United States Patent
Callens et al.

(10) Patent No.: US 7,509,242 B2
(45) Date of Patent: Mar. 24, 2009

(54) METHOD FOR DESIGNING THE SPIDER SPRING OF A CONTROL CLUSTER OF A NUCLEAR FUEL ASSEMBLY, CORRESPONDING SYSTEM, COMPUTER PROGRAM AND PRODUCT

(75) Inventors: Catherine Callens, Lyons (FR); Hélène Segura, Lyons (FR)

(73) Assignee: Framatome ANP, Courbevoie (FR)

( * ) Notice: Subject to any disclaimer, the term of this patent is extended or adjusted under 35 U.S.C. 154(b) by 348 days.

(21) Appl. No.: 10/506,360

(22) PCT Filed: Feb. 19, 2003

(86) PCT No.: PCT/FR03/00556

§ 371 (c)(1),
(2), (4) Date: Feb. 9, 2005

(87) PCT Pub. No.: WO03/075282

PCT Pub. Date: Sep. 12, 2003

(65) Prior Publication Data

US 2005/0157835 A1    Jul. 21, 2005

(30) Foreign Application Priority Data

Mar. 1, 2002    (FR) .................................. 02 02657

(51) Int. Cl.
*G06F 17/10*    (2006.01)

(52) U.S. Cl. .............................................. 703/2; 703/7
(58) Field of Classification Search .................... 703/2, 703/6, 7; 376/225, 234, 261, 302
See application file for complete search history.

(56) References Cited

U.S. PATENT DOCUMENTS

| 4,673,544 | A | * | 6/1987 | Rohr | 376/261 |
| 4,826,648 | A | | 5/1989 | Savary | 376/225 |
| 5,076,995 | A | | 12/1991 | Canat | 376/234 |
| 5,742,653 | A | * | 4/1998 | Erbes et al. | 376/302 |

OTHER PUBLICATIONS

Kim et al., H.-K. Fretting Wear of Laterally Supported Tube, Wear, vol. 250, Iss. 1-12, Oct. 2001, pp. 535-543.*
Mackerle, J. Finite Elements in the Analysis of Pressure Vessels and Piping, An Addendum (1996-1998), International Journal of Pressure Vessels and Piping, vol. 76, Iss. 7, Jun. 1999, pp. 461-485.*

* cited by examiner

*Primary Examiner*—Russell Frejd
(74) *Attorney, Agent, or Firm*—Davidson, Davidson & Kappel, LLC

(57) ABSTRACT

A method for designing a nuclear fuel assembly, including the steps of establishing a progression of a speed of the control cluster after the impact of the support against the upper end piece, establishing, based on the speed established in step a), a maximum longitudinal load for compression of the spring, and establishing, based on the maximum longitudinal load for compression, at least a maximum shearing stress in the spring.

6 Claims, 6 Drawing Sheets

METHOD FOR DESIGNING THE SPIDER SPRING OF A CONTROL CLUSTER OF A NUCLEAR FUEL ASSEMBLY, CORRESPONDING SYSTEM, COMPUTER PROGRAM AND PRODUCT

FIELD OF INVENTION

The present invention relates to a method for designing a nuclear fuel assembly which is intended to be positioned in a nuclear reactor, the assembly comprising a plurality of guide tubes, and a control cluster which itself comprises a plurality of control rods which are received in the guide tubes and a support for control rods, the assembly comprising a helical spring for damping the impact of the support against an upper end piece of the assembly in the event of the control cluster falling during a shutdown of the nuclear reactor.

BACKGROUND OF THE INVENTION

It will be appreciated that nuclear fuel assemblies must be dependable in order to allow reliable operation of nuclear reactors. Thus, design and construction provisions for such assemblies have been drawn up.

These provisions impose a general framework and minimum criteria which the assembly constructors must take into consideration.

As far as the helical damping spring is concerned, the design provisions require verification by means of tests that the integrity of the spring has not been affected during the impact brought about in the event of a shutdown of the reactor.

Although the criterion imposed by the design provisions allows assemblies to be designed with satisfactory reliability, it would be desirable to limit the safety margins during design in order to reduce the mass and the cost of the assemblies constructed.

SUMMARY OF THE INVENTION

An objective of the invention is to overcome this problem by providing a method which allows reliable nuclear fuel assemblies to be designed, while limiting the design margins.

To this end, the invention relates to a method for designing a nuclear fuel assembly which is intended to be positioned in a nuclear reactor, the assembly comprising a plurality of guide tubes and a control cluster which itself comprises a plurality of control rods which are received in the guide tubes and a support for control rods, the assembly comprising a helical spring for damping the impact of the support against an upper end piece of the assembly in the event of the control cluster falling during a shutdown of the nuclear reactor, wherein the method comprises the following steps:

a) establishing a progression of a speed of the control cluster after the impact of the support against the upper end piece,
b) establishing, based on the speed established in step a), a maximum longitudinal load for compression of the spring, and
c) establishing, based on the maximum longitudinal load for compression, at least a maximum shearing stress in the spring.

According to specific embodiments, the method can comprise one or more of the following features, taken in isolation or according to all technically feasible combinations:

- a maximum shearing stress is a shearing stress along the neutral axis of the spring,
- a maximum shearing stress is a shearing stress along the axis of the spring nearest the longitudinal centre axis thereof,
- the method further comprises a step for verifying, using a maximum shearing stress established in step c), that a maximum stress admissible by the spring has not been exceeded.

The invention further relates to a system for designing a nuclear fuel assembly, wherein it comprises an arrangement for performing the steps of a method as defined above.

According to a variant of the invention, the system comprises a computer and storage arrangement, in which at least a program comprising instructions for performing steps of the method for designing a nuclear fuel assembly is stored.

The invention further relates to a computer program comprising instructions for performing the steps of a method as defined above.

The invention also relates to a medium which can be used in a computer and on which a program as defined above is recorded.

BRIEF DESCRIPTION OF THE DRAWINGS

The invention will be better understood from a reading of the description below which is given purely by way of example with reference to the appended drawings.

DETAILED DESCRIPTION

Figure 1:
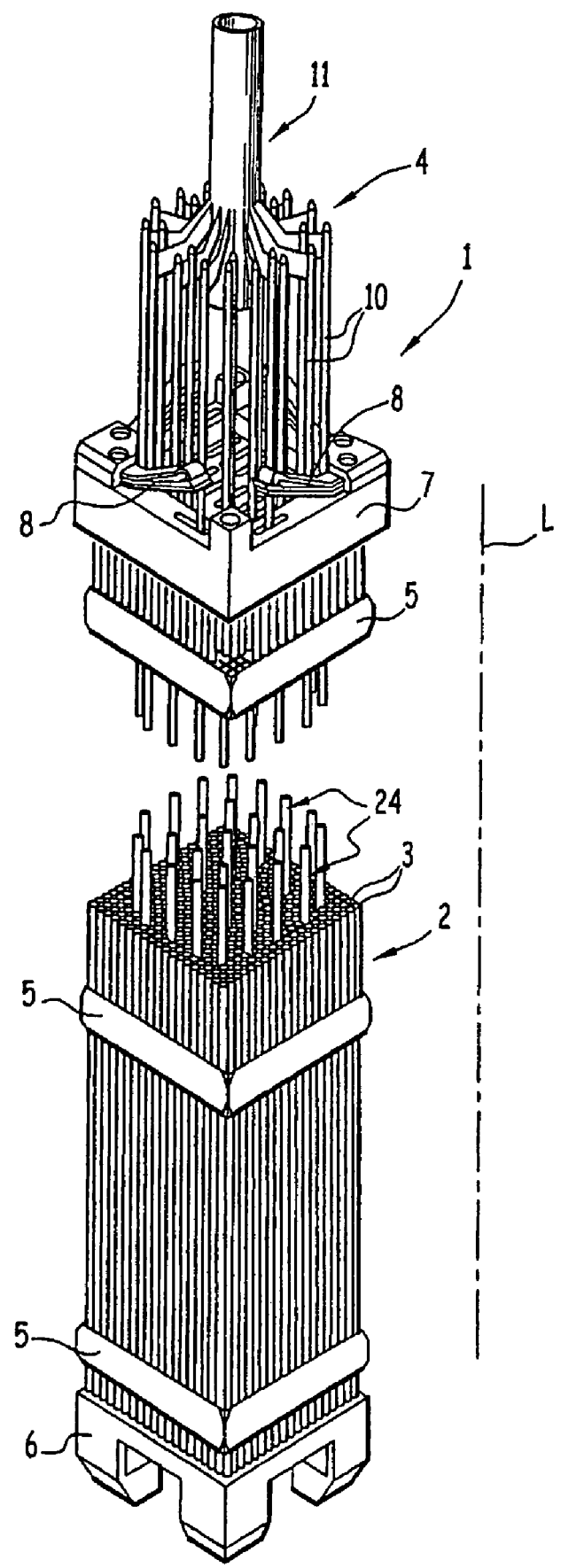
FIG. 1 is a schematic, perspective cutaway view of a nuclear fuel assembly which is designed by a method according to the present invention.

FIG. 1 illustrates a nuclear fuel assembly 1 which mainly comprises a square-based lattice 2 for nuclear fuel rods 3 and a control cluster 4.

The assembly 1 comprises grids 5 for maintaining the rods 3, the grids 5 distributed over the height of the rods 3. A lower end piece 6 is arranged under the lower ends of the rods 3 and an upper end piece 7 above the upper ends of the rods 3. The upper end piece 7 is provided with springs 8 for pressing against the upper bearing plate of the reactor core, in which the assembly 1 is intended to be placed.

The control cluster 4 comprises a plurality of control rods 10, for example, 24. Conventionally, the control rods 10 comprise a material which absorbs neutrons.

The rods 3 and 10 extend in parallel with a vertical longitudinal direction L.

The rods 10 are carried at the upper ends thereof by a support 11 which is generally referred to as a spider.

Figure 2:
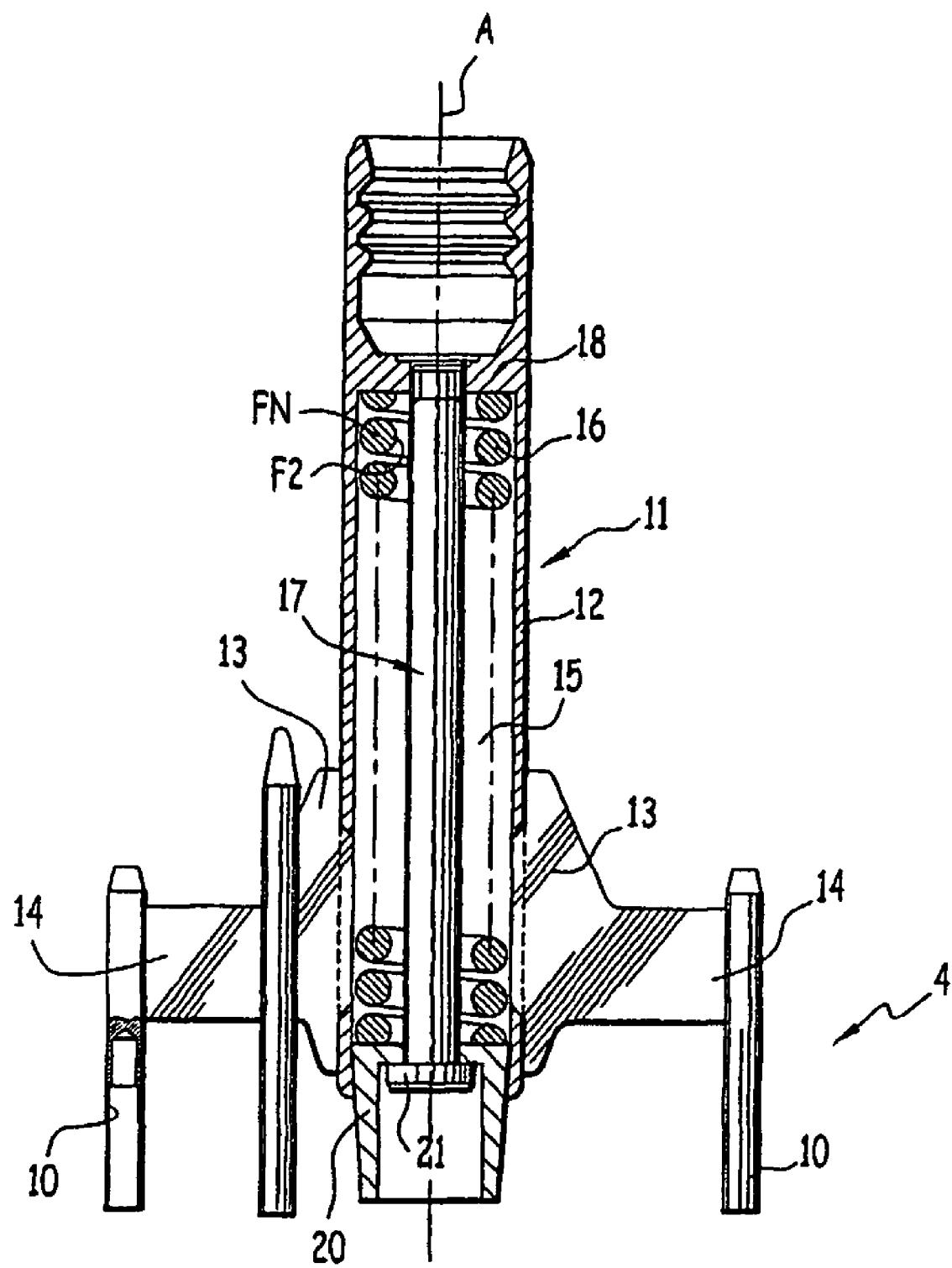
FIG. 2 is a schematic, partially sectioned side view drawn to an enlarged scale of the structure of the spider of the assembly of FIG. 1.

As illustrated more particularly in FIG. 2, the spider 11 comprises a vertical central upper head 12 and a series of arms or vanes 13 which extend radially outwards from the lower end of the upper head 12 as far as the radially outer ends 14 thereof. Each control rod 10 is connected to an arm 13 at the upper end thereof.

The upper head 12 of the spider 11 has a central blind hole 15 which opens towards the bottom and in which a damping helical spring 16 is received. The spring 16 extends vertically along a center axis A. A tightening screw 17 extends substantially over the entire height of the hole 15 and is screwed into the wall 18 delimiting the upper portion of the hole 15.

The lower portion of the screw 17 extends through the base of a retaining ring 20 which rests on the lower end of the spring 16. The head 21 of the screw 17 rests, at the top, against the base of the retaining ring 20 in order to press the spring 16 against the wall 18 of the upper head 12.

Figure 3:
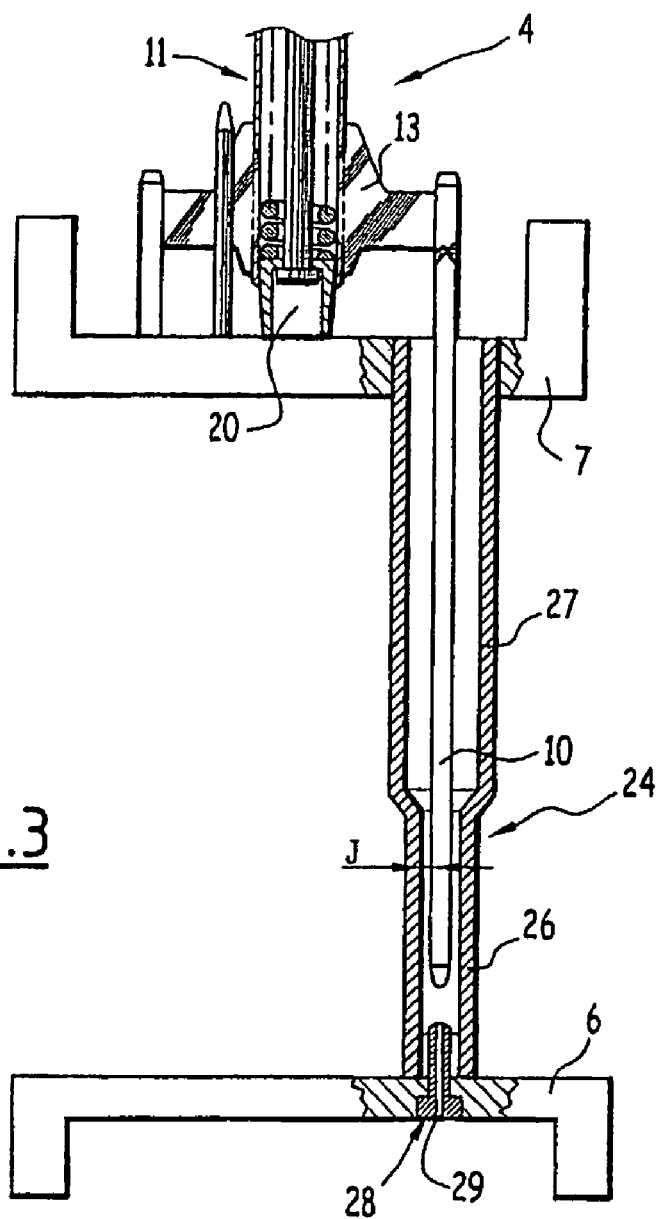
FIG. 3 is a partial schematic side view of the assembly of FIG. 1, illustrating more particularly a pair comprising a guide tube/control rod.

As illustrated in FIG. 3 for a control rod 10, each control rod 10 is received in a respective guide tube 24 which is arranged in the lattice 2 of fuel rods 3. In this manner, 24 pairs comprising a guide tube/control rod are formed. Since each of these pairs has a similar structure, only one will be described below.

The guide tube 24 extends from the lower end piece 6 as far as the upper end piece 7. The guide tube 24 comprises a lower portion 26 of reduced inside diameter and an upper portion 27. The lower portion 26 is connected to the lower end piece 6 by a collared screw 28, through which a vertical through-hole 29 extends.

The lower portion 26 of the guide tube 24 surrounds the control rod 10 with a radial passage gap J.

The upper portion 27 is fixed to the upper end piece 7 and opens at the outside of the assembly 1.

Figure 4:
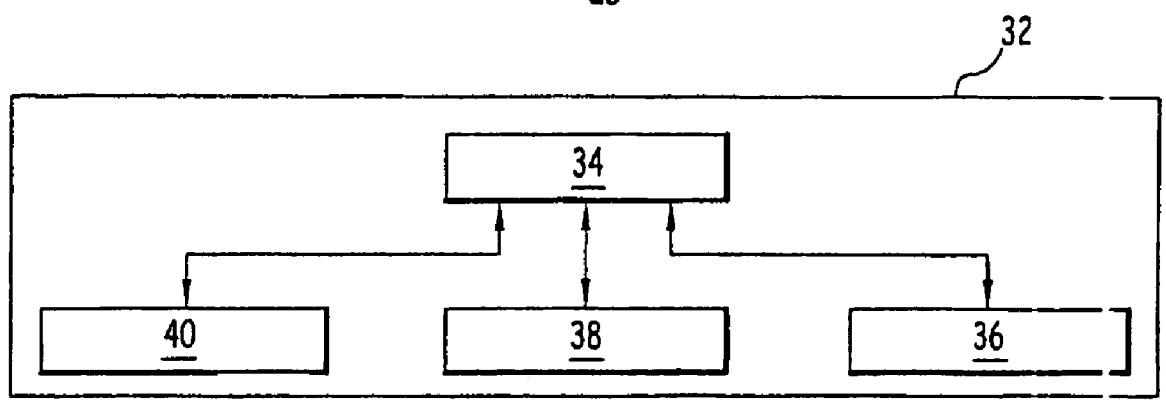
FIG. 4 is a block diagram illustrating the system for designing the assembly of FIG. 1.

Lateral apertures 30, only one of which can be seen in FIG. 4, are provided in the upper portion 27 near the lower portion 26.

When the assembly 1 is placed in a nuclear reactor, the cooling liquid of the reactor fills the interior of the guide tube 24.

Conventionally, the control cluster 4 can be moved vertically relative to the remainder of the assembly 1 in order to allow adjustment of the reactivity during normal operation of the reactor, and therefore variations in power from zero power up to maximum output depending on the vertical introduction of the control rods 10 in the lattice 2 of rods 3. The vertical displacement of the control cluster 24 is conventionally carried out by a drive rod which is connected to the upper end of the upper head 12.

When the reactor is shut down, the drive rod and the assembly 4 fall due to gravity.

At the start of this falling movement, the control rods 10 are guided only by the upper portions 27 of the guide tubes 24 and have not yet reached the lower portions 26.

Once the falling action has ended, the lower ends of the control rods 10 are introduced in the lower portions 26. The cooling fluid contained in the portions 26 is then violently forced, on the one hand, upwards thereby and, on the other hand, downwards through the apertures 29 of the collared screws 28.

Each lower portion 26 therefore behaves in the manner of a hydraulic damper braking the falling movement of the corresponding control rod 10, and therefore of the assembly 4.

This braking phase ends at the end of the travel path with the impact of the spider 11 against the upper end piece 7 of the assembly 1.

This impact is carried out by a retaining ring 20. During this impact, the spring 16 is compressed vertically in order to absorb the shock.

According to the invention, the assembly 1 has been designed in order to take into consideration the specific stresses brought about in the assembly by the fall of the control cluster 4 during such a shutdown of the reactor.

In this manner, in order to design the assembly 1, in particular a data-processing system 32 has been used, as illustrated schematically in FIG. 4.

This system 32 comprises, for example, a computer or data processing unit 34 comprising one or more processors, a storage arrangement 36, input/output arrangement 38, and optionally display arrangement 40.

Instructions which can be performed by the computer 34 are stored in the form of one or more programs in the storage arrangement 36.

These instructions are, for example, instructions in FORTRAN programming code.

Figure 5:
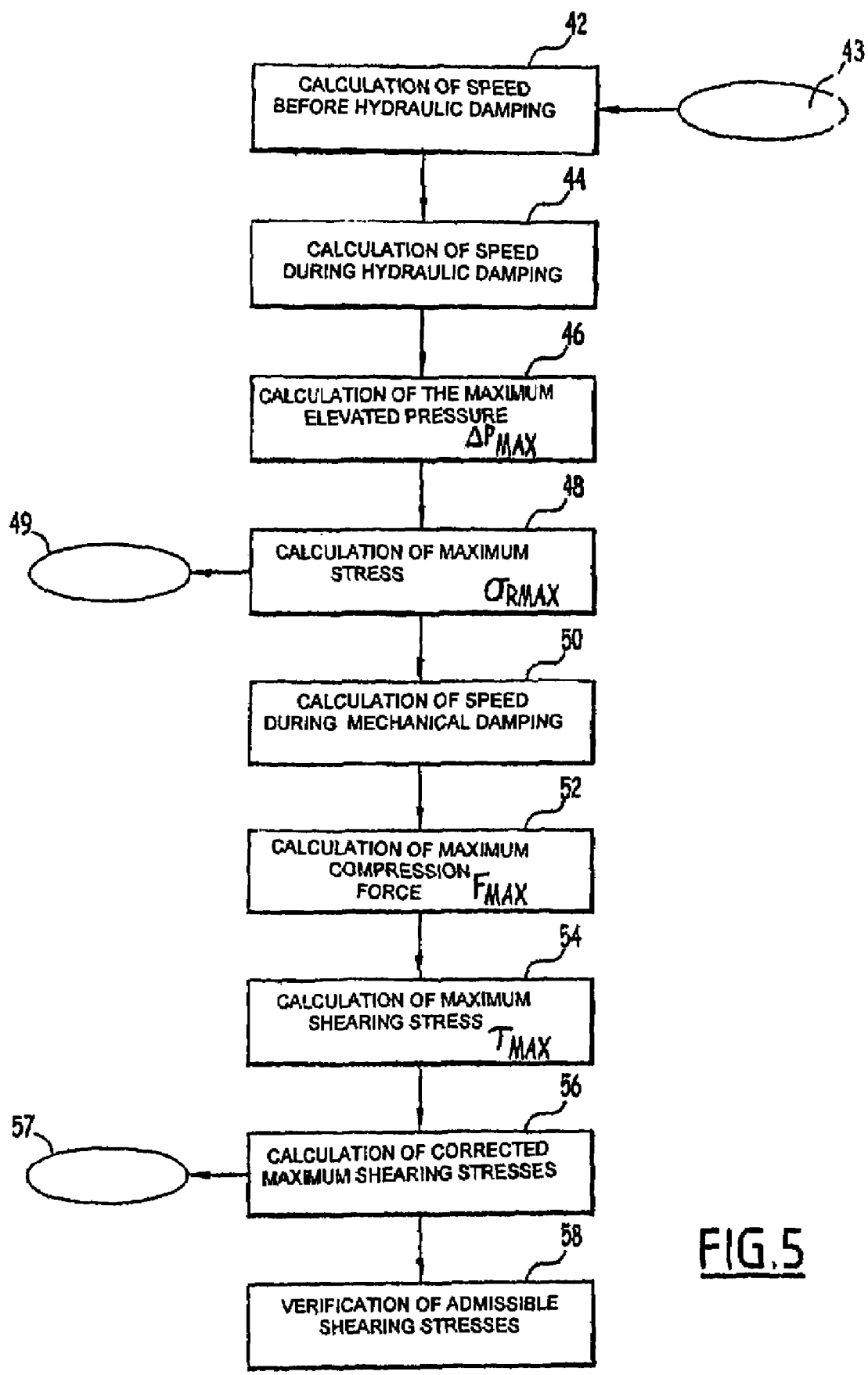
FIG. 5 is a flow chart illustrating successive steps of the design method carried out by the system of FIG. 4.

These various instructions, when they are performed by the computer 34, allow the method illustrated by the flow chart of FIG. 5 to be performed.

In a first step illustrated by the box 42 of this Figure, the computer 34 calculates, based on data 43, the development of the falling speed of a control rod 10 in the upper portion 27 of the corresponding guide tube 24 in the event of a shutdown of the reactor.

This calculation can be performed assuming, for example, that the control rod 10 is first subjected to constant loads:

gravitational force: $fg=Mg$,

Archimedes' thrust: $fa=-\rho gV$, pressure difference in the core: $fc$, and mechanical friction: $fm$, where M and V are the mass and the volume, respectively, of the assembly 4 and the drive rod thereof.

The control rod 10 is also subjected to loads as a function of the speed or position thereof, for example, hydraulic friction which can be obtained from: $fh=-c1\,(M+\rho V)\,v^2$, with v=speed of the assembly 4 and therefore of the rod 10 in question.

Thus, the equation of the movement of the rod in the upper portion 27 of the guide tube 24 is as follows:

$$(M+\rho V)\frac{dv}{dt} = \sum f$$

This gives:

$$\frac{dv}{dt} = c2 - c1\,v^2$$

with c1=hydraulic friction in the guide tube and $$c2 = \frac{fg+fa+fc+fm}{M+\rho V}.$$

C1 and c2 are, for example, experimental data measured during drop tests of the control cluster 4. These data are, with the other data necessary for the calculation, such as the mass and the volume of the assembly 4 and the drive rod thereof, introduced, for example, in the form of a file 43 by way of the input/output arrangement 38.

The computer 34 resolves the equation of the movement of the control rod 10, for example, using the NEWTON method.

Figure 6:
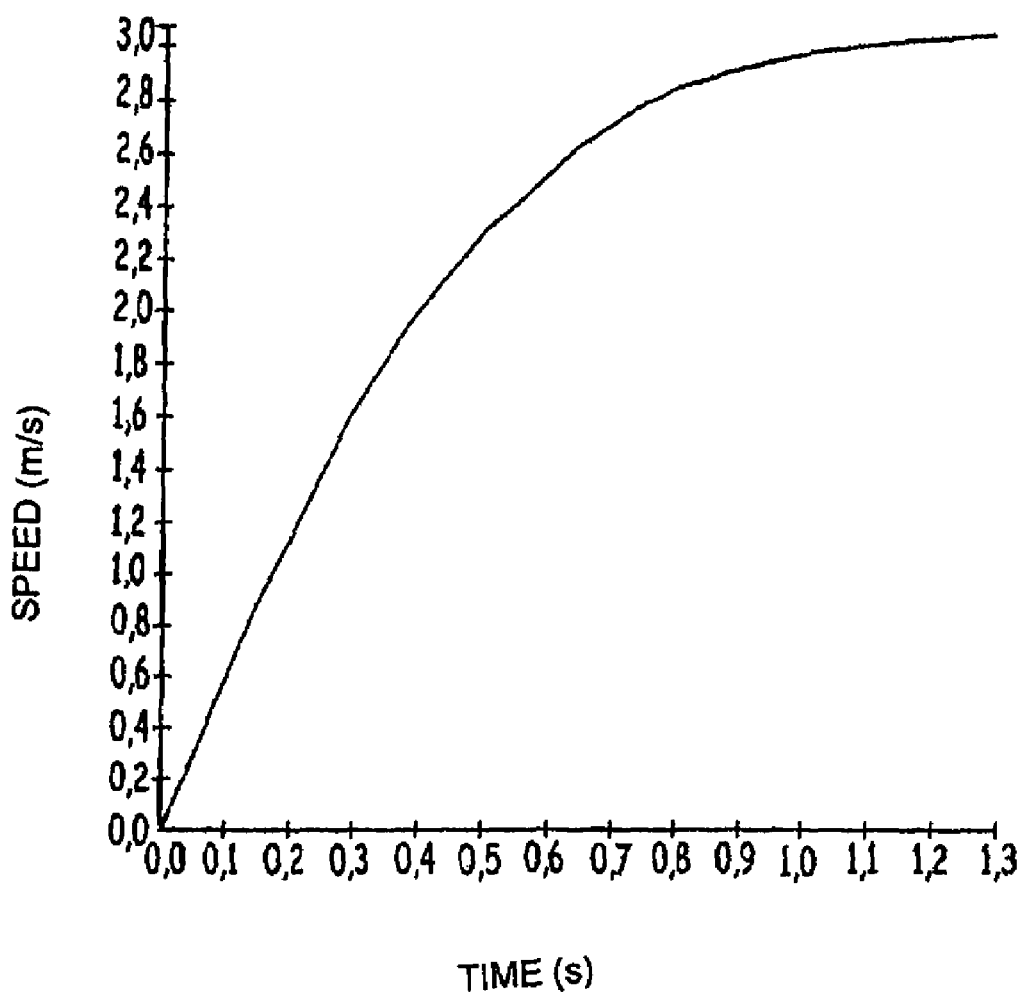
FIG. 6 is a progression curve of the falling speed of a control rod before it is introduced in the lower portion of the corresponding guide tube, this progression being calculated by the system of FIG. 4.

Thus, the progression of the speed of the control rod 10 in the upper portion 27 is known as a function of time. The profile established in this manner can be displayed in the form of a curve by the display arrangement 40. This curve is illustrated by FIG. 6.

In this manner, at the end of the step illustrated by the box 42, the speed of the control rod 10 is known at the point of entry to the lower damping portion 26 of the guide tube 24.

Based on the results of the step of box 42, the computer 34 calculates the progression of the speed of the control rod 10 during its fall in the lower damping portion 26.

This step is schematically illustrated by the box 44.

This step can be carried out using the following equation:

$$-\frac{dv}{dt} = c2 - \left(c1 + \frac{SCA \times NCA \Delta P}{M + \rho V v^2}\right)v^2 \text{ with}$$

$$c2 = \frac{fg + fa}{M + \rho V} = \frac{M - \rho V}{M + \rho V}g$$

SCA=cross-section of the rod 10 and

NCA number of rods 10 in the assembly 4.

Therefore, the hypothesis that $f_c$ and $f_m$ are negligible is applied here.

The difference $\Delta P$ represents the elevated pressure produced in the cooling liquid contained in the guide tube 24, that is to say, the pressure thereof between the lower end of the rod 10 and the pressure present in the upper portion 27 of the guide tube 24.

$\Delta P$ can be established by the following formula:

$$\Delta P = \frac{1}{2}\rho Q^2 v^2 (EXPA + CONTRA + FECR \times CISA \times z) \text{ where}$$

$$EXPA = \left(\frac{SCA}{SACM}\left(1\frac{SACM}{SACTG}\right)\right)^2$$

with SM=cross-section of the lower portion 26,

SACM=SM−SCA=cross-section of the annular space between the rod 10 and the lower portion 26, SACTG=STG−SCA, where STG is the cross-section of the upper portion 27 of the guide tube 24, $$CONTRA = 0.4\left(1\frac{SACM}{SM}\right)\left(\frac{SCA}{SACM}\right)^2,$$

FECR=coefficient of loss of load owing to friction in the lower portion 26, $$CISA = \left(\frac{SCA}{SM}\right)^2\frac{1}{DM},$$

DM=mean diameter of the guide tube 24 in the upper portion 27, z=height of the rod 10 introduced in the lower portion 26 of the guide tube 24, and Q=fraction of liquid, flowing upwards out of the lower portion 26.

The resolution of the equations governing the movement of the rod 10 after entry into the lower portion 26 is carried out by the computer 34, for example, using the RUNGE-KUTTA method.

Thus, at the end of the step 44, the progression of the speed of the control rod 10 in the lower portion 26 of the guide tube 24 is known before the impact of the spider 11 on the upper end piece 7.

Figure 7:
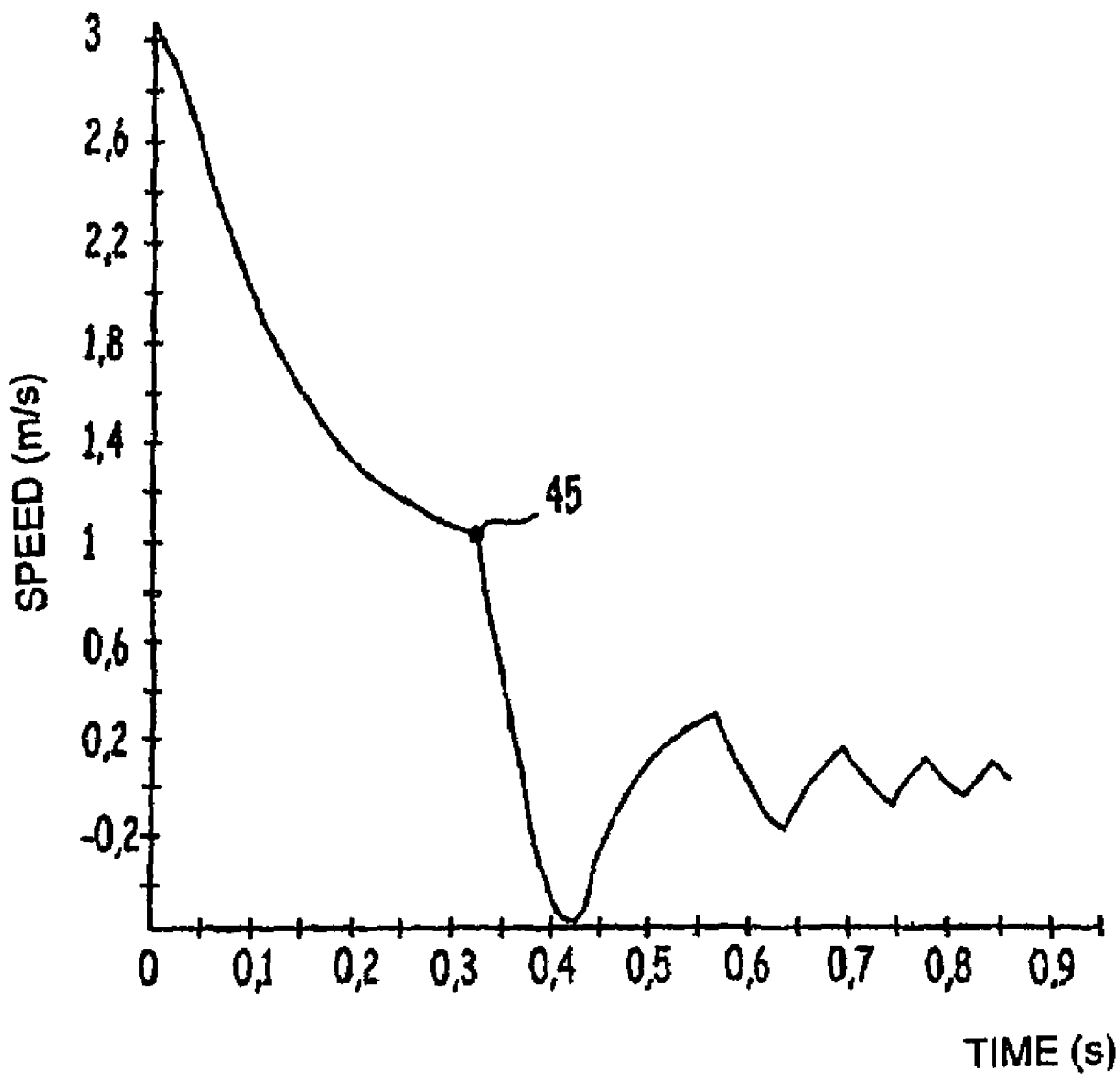
FIG. 7 is a progression curve of the falling speed of the same control rod in the lower portion of the corresponding guide tube, this progression being calculated by the system of FIG. 4.

The speed profile established in this manner can be displayed, for example, by the arrangement 40, as illustrated in FIG. 7. On the curve in FIG. 7, the speed profile established during step 44 is the portion located to the left of the point 45.

The computer 34 then performs, in the step of box 46, the calculation of the maximum elevated pressure produced $\Delta P_{MAX}$.

This calculation can be performed, for example, based on the formula:

$$\Delta P = \frac{1}{2}\rho Q^2 v^2 (EXPA + CONTRA + FECR \times CISA \times z).$$

The computer 34 performs, in the step of box 48, the calculation of a circumferential stress and maximum normal $\sigma_{\theta MAX}$, to which the lower portion 26 of the guide tube 24 is subjected owing to the maximum elevated pressure $\Delta P_{MAX}$.

This stress can be calculated based on the formula:

$$\sigma_{\theta MAX} = \frac{1}{2}\Delta P_{MAX}\left(\frac{DPM}{EMP} + 1\right),$$

where DPM=inside diameter of the lower portion 26 and EMP=minimum thickness of the wall of the lower portion 26.

The system 32 can then provide, owing to the input/output means 38, a first result in the form of a file 49 containing the value $\sigma_{\theta MAX}$ established, and optionally the maximum elevated pressure $\Delta P_{MAX}$ established.

Next, the system 32 performs the calculation of the progression of the speed of the control rod 10 after it comes into contact with the spider 11 and the upper end piece 7. This calculation step is illustrated by the box 50 in FIG. 5.

This calculation can be performed, for example, using the following equation when the ring 20, and therefore the spider 11, is in contact with the upper end piece 7:

$$(M + \rho V)\frac{dv}{dt} = (M - \rho V)g - PRCH - K(z - LAI) - c3v$$

with PRCH=pretension of the spring 16=PRCMP×K, where PRCMP is the precompression of the spring 16 and K the rigidity of the spring 16, LAI=distance travelled by the control rod in the lower portion 26 before impact, and c3=coefficient of hydraulic damping in order to model the damping in the lower portion 26.

In the event of a rebound, that is to say, when the spider 11 is no longer in contact with the upper end piece 7, the equation for movement of the control rod 10 in question is written as follows:

$$(M + \rho V)\frac{dv}{dt} = (M - \rho V)g - c3v$$

These two equations are integrated by the computer 34, for example, using the RUNGE-KUTTA method.

Therefore, the step 50 allows the kinematics of the control cluster 4 to be established during the mechanical damping of the shock by the spring 16. The speed profile established in this manner can be displayed, for example, by the arrangement 40. This profile corresponds to the portion located to the right of the point 45 on the curve in FIG. 7.

Based on the results of this step, the system 32 performs, in the step 52, the calculation of a maximum vertical compression force $F_{MAX}$, to which the spring 16 is subjected during the mechanical damping.

This calculation can be performed, for example, based on the following formula:

$$F_{MAX} = \max\{K(z-LAI) + PRCH\}$$

The system 32 then performs, in the step of box 54, the calculation of an approximate maximum shearing stress $\tau_{MAX}$ in the spring 16:

$$\tau_{MAX} = \frac{8F_{MAX}DFN}{\pi DFR^3}$$

with DFN=DER−DFR and
DER=outside diameter of the spring 16,
DFR=diameter of the wire of the spring 16.

Subsequently, the system 32 can optionally perform, based on the maximum stress $\tau_{MAX}$, the calculation of maximum corrected stresses.

These stresses can be calculated by multiplying $\tau_{MAX}$ by different factors.

Thus, it is possible to calculate:

$$\tau_{MAX1} = \tau_{MAX} \times K_c, \text{ and}$$

$$\tau_{MAX2} = \tau_{MAX} \times K,$$

$$\text{with } Kc = 1 + \frac{0.5}{C},$$

$$C = \frac{DFN}{DFR}, \text{ and}$$

$$K = \frac{4C-1}{4C-4} + \frac{0.615}{C}$$

The stress $\tau_{MAX1}$ corresponds to the shearing stress along the neutral axis FN (FIG. 2) of the spring 16. The stress $\tau_{MAX2}$ corresponds to the stress along the axis F2 (FIG. 2) of the spring 16 nearest the vertical center axis A of the spring 16 (see FIG. 2).

At the end of this step illustrated by the box 56, the system 32 provides the various maximum shearing stresses calculated, for example, in the form of data stored in a file 57, which are transmitted by the input/output arrangement 38.

Based on the data contained in the files 49 and 57, which have also been stored in the storage arrangement 36, the computer 34 will verify that the maximum stresses calculated are indeed acceptable for the materials which respectively constitute the guide tube 24 and the helical spring 16.

This step has been schematically illustrated by the box 58 in FIG. 5. During such a step, the system 32 will, for example, verify that the maximum shearing stresses calculated during the steps 54 and 56 are less than maximum values admissible by the material which constitutes the spring 16. This verification is performed by a comparison of $\tau_{MAX}$, $\tau_{MAX1}$ and $\tau_{MAX2}$ with a maximum value admissible by the material of the spring 16.

As far as the maximum circumferential stress $\sigma_{\theta MAX}$ is concerned, the verification can be performed based on a formula of the type:

$$f(\sigma \theta_{MAX}) < \sigma_{admissible}$$

where $\sigma_{admissible}$ refers to the material which constitutes the lower portions 26 of the guide tubes 24.

The function f can be a function which takes into consideration other stresses to which the guide tubes 24 can be subjected. Such a stress can be a vertical compression stress $\sigma_A$, to which the guide tubes 24 are subjected during the contact of the springs 8 of the upper end piece 7 against the upper bearing plate of the core in order to counterbalance the hydrostatic thrust during operation.

Thus, the function f can be, for example, in the form of f $(\sigma\theta_{MAX}, \sigma A) = \sigma\theta_{MAX} + \sigma A$.

It will be appreciated that this last step, illustrated by the box 58, can be performed by separate software which generally performs the validation of various design parameters of the assembly 1 based on results provided by various pieces of software each dedicated to taking into consideration specific operating conditions and which include the software which performs the steps 42, 44, 46, 48, 50, 52, 54 and 56.

In general terms, the file 43 comprising the data 43 used by the method for the various calculations can comprise the data of Table 1 below.

TABLE 1

| | | |
|---|---|---|
| outside diameter of control rod 10 | (m) | Nominal; maximum |
| inside diameter of upper portion 27 | (m) | Nominal; maximum |
| inside diameter of lower portion 26 | (m) | Nominal; maximum |
| total length of lower portion 26 | (m) | |
| damping travel before impact | (m) | |
| minimum thickness of wall of lower portion 26 | (m) | |
| maximum roughness of rod 10/tube 24 | (m) | |
| diameter of aperture 29 | (m) | |
| length of aperture 29 | (m) | |
| roughness of aperture 29 | (m) | |
| moving mass M | (kg) | |
| volumetric mass of liquid | (kg/m$^3$) | |
| kinematic viscosity of liquid | (m$^2$/s) | |
| c1 | (/m) | |
| c2 | (m/s$^2$) | |
| Young's modulus of guide tube 24 | (Pa) | |
| Poisson's ratio of guide tube 24 | | |
| spring precompression 16 | (m) | |
| preloading of spring 16 | (N) | |
| length of spring 16 with contiguous turns | (m) | |
| outside diameter of spring 16 | (m) | |
| diameter of wire of spring 16 | (m) | |
| compression when upper head 12 is in contact with upper end piece 7. | (m) | |
| END | | |

Similarly, the file 49 comprising the results from step 48 an comprise the data of Table 2 below.

TABLE 2

| | |
|---|---|
| $\Delta P_{MAX}$: maximum elevated pressure in lower portion 26 | (Pa) |
| $Z_{MAX}$: corresponding penetration in lower portion 26 | (m) |
| $\sigma_{\theta MAX}$: maximum stress in lower portion 26 | (Pa) |
| fmax: maximum force on lower end piece 6 | (N) |
| tdur: duration of fall in lower portion 26 before impact | (s) |
| vfin: speed of impact of assembly 4 on upper end piece 7 | (m/s) |

The file 57 comprising the results of step 56 can itself contain the data of Table 3 below.

TABLE 3

| | |
|---|---|
| $F_{MAX}$: maximum compression force on spring 16 | (N) |
| $h_{MAX}$: maximum deflection of spring 16 | (m) |
| $\tau_{MAX}$: approximate maximum stress in spring | (Pa) |
| $\tau_{MAX1}$: approximate maximum stress corrected by Kc | (Pa) |
| $\tau_{MAX2}$: approximate maximum stress corrected by K (Wahl coefficient) | (Pa) |

It has been possible to verify by experiment that the maximum elevated pressures and the maximum stresses obtained by means of steps 42, 44, 46 and 48 were reliable. In this manner, the first corresponding part of the method allows reliable guide tubes 24 to be designed. Furthermore, this first part calculates only a single stress which appears to be the pertinent stress for the conditions being considered. Consequently, this first part of the method allows the security margins to be limited during design, and therefore assemblies which are relatively light and economical to be designed.

The second part of the method, which corresponds to steps 50, 52, 54 and 56, also allows maximum stresses to be reliably calculated, as confirmed by experiment.

Thus, the second part of the method allows a reliable design to be arrived at by calculation for the spider springs 16, which design is found to be advantageous in comparison with the method of tests alone which is currently imposed by provisions. It will be appreciated that the second part of the method calculates only the small number of stresses, and in particular those on the axis F2 of the spring 16 nearest the center axis A of the spring, which are found to be pertinent to the conditions envisaged. In this manner, the second part of the method allows the design margins to be reduced.

In more general terms, the steps 42, 44, 46 and 48, on the one hand, and 50, 52, 54 and 56, on the other, can be performed by separate pieces of software.

In order to increase the reliability of the calculation, for performing the first part of the method it is possible to use, as the passage gap J, the nominal value of the gap, or this nominal value corrected by the manufacturing tolerance, or a value resulting from statistical studies of the distribution of passage gaps J obtained in constructed assemblies.

In a variant, it is possible to use a gap value J which is greater for steps 42 and 44 and a smaller gap value J for steps 46 and 48. This allows a high stress value $\sigma_{\theta MAX}$ to be calculated because the speed reached during the fall of the rod 10 in question is high and the volume available in the lower portion 26 for the liquid during damping is small. However, this high stress value is not unrealistic and therefore does not lead to unjustified design margins, as illustrated by the following example.

According to a specific variant, the upper value can be a maximum value for gap J which is verified with a given probability, for example, 95%, in constructed assemblies, and the lower value can be a minimum value obtained with the same probability. This variant allows an approximation of the situation where a single pair comprising a guide tube/control rod has minimum gap J, where the maximum stress $\sigma_{\theta MAX}$ would be reached, and where all the other pairs comprising a guide tube/control rod have the maximum passage gap J, which would be the most extreme case.

In some variants, the first part of the method could also take into consideration forms of the lower damping portion 26 which are different from those described previously. In this manner, these lower damping portions could have a plurality of successive portions of reduced diameter optionally separated by portions of increased diameter, generally referred to as cavities. In some variants, the first part of the method is performed with collared screws 28 which are not perforated by holes 29.

In still more general terms, the first part and the second part of the design method described can be used independently of each other. In this manner, it is possible to perform the second part relating to the design of the spring 16 without referring to the calculation of the elevated pressure $\Delta P$ and the stress $\sigma_{\theta MAX}$.

What is claimed is:

1. A system for designing a nuclear fuel assembly which is intended to be positioned in a nuclear reactor, the assembly comprising a plurality of guide tubes and a control cluster which itself comprises a plurality of control rods which are received in the guide tubes and a support for the control rods, the assembly comprising a helical spring for damping an impact of the support against an upper end piece of the assembly in an event of the control cluster falling during a shutdown of the nuclear reactor, the system comprising a computer and a storage arrangement configured to store at least a program comprising instructions for performing the following steps of designing a nuclear fuel assembly:

establishing a progression of speed of the control cluster after the impact of the support against the upper end piece;

establishing, based on the speed of the control cluster after the impact of the support against the upper end piece, a maximum longitudinal load for compression of the spring; and establishing, based on the maximum longitudinal load for compression of the spring, at least a maximum shearing stress in the spring.

2. The system according to claim 1, wherein the maximum shearing stress is a shearing stress along a neutral axis of the spring.

3. The system according to claim 2, wherein the maximum shearing stress is a shearing stress along an axis of the spring nearest a longitudinal center axis thereof.

4. The system according to claim 1, wherein the maximum shearing stress is a shearing stress along an axis of the spring nearest a longitudinal center axis thereof.

5. The system according to claim 1, the program further comprising instructions for performing the step of:

verifying, using the maximum shearing stress in the spring, that a maximum stress admissible by the spring has not been exceeded.

6. A computer-readable medium encoded with executable instructions for designing a nuclear fuel assembly which is intended to be positioned in a nuclear reactor, the assembly comprising a plurality of guide tubes and a control cluster which itself comprises a plurality of control rods which are received in the guide tubes and a support for the control rods, the assembly comprising a helical spring for damping an impact of the support against an upper end piece of the assembly in an event of the control cluster falling during a shutdown of the nuclear reactor, the encoded instructions, which when executed by a computer:

establish a progression of speed of the control cluster after the impact of the support against the upper end piece;

establish, based on the speed of the control cluster after the impact of the support against the upper end piece, a maximum longitudinal load for compression of the spring; and establish, based on the maximum longitudinal load for compression of the spring, at least a maximum shearing stress in the spring.

* * * * *